United States Patent Office 2,822,271
Patented Feb. 4, 1958

2,822,271

PHOTOSENSITIVE MATERIAL

Wilhelm A. Krieger, Summit, N. J., assignor to Keuffel & Esser Company, Hoboken, N. J., a corporation of New Jersey No Drawing. Application October 19, 1953
Serial No. 387,041

5 Claims. (Cl. 96—75)

This invention relates to the art of photosensitive materials of the type used for the reproduction of engineering drawings. More particularly, it relates to the improvement of the appearance of diazotype prints.

Various means and methods have been suggested in recent years for the improvement of diazotype prints without changing the chemical constitution of the dye forming components. For example, colloidal silica has been suggested both as a precoat (Jahoda Patent No. 2,433,515) and as an addition to the sensitizing solution (Von Glahn Patent No. 2,566,709). Colloidal silica has been used to some extent commercially in the diazotype art but it has found its principal success as a precoat according to the Jahoda patent in the blueprint art. More recently, it has been proposed to precoat the base material with a colloidal dispersion of a synthetic resin in order to form a discontinuous film of discrete particles of colloidal size on the sheet. This latter process has enjoyed considerable commercial success in the diazotype art.

Now, it has been found that the appearance of diazotype prints can be still further improved by forming a continuous film of resin on the sheet. This gives the prints a somewhat glossy appearance and, even at low exposures, the colored areas are smooth (even density throughout). This gives the material practically a photographic acceptance (approaching silver halide emulsions); i. e., the material consistently has good latitude which means that usable prints can be made over a wide range of exposures. The present invention makes it possible by means of a simple procedure to obtain diazotype prints on a relatively inexpensive paper base of a quality which was heretofore only obtainable on more expensive base sheets.

The continuous film of the present invention may be obtained either by precoating the base material with a dispersion of synthetic resin or by incorporating a dispersion of synthetic resin in the diazotype sensitizing solution or by a combination of both. In any case the concentration of the synthetic resin solids must be greater than would form the discontinuous precoating of the prior art. The minimum concentration in either solution is about 5% solids. In the precoating, the maximum concentration of solids is about 50% and in the sensitizing solution, the maximum concentration of solids is about 15%. The optimum concentrations will depend to some extent on the coating conditions, principally the time the solution is permitted to remain in contact with the sheet since this time will also effect the amount of solids which are actually coated on the sheets.

Dispersions useful in the present invention are of the vinyl type including polymers and copolymers of these synthetic resins dispersed in an aqueous carrier. The dispersions ordinarily include certain other additives such as stabilizers, plasticizers and the like. If the dispersion is to be mixed with the sensitizing solution, it is essential that it be stabilized so as to be compatible with the particular solution used; i. e., the electrolytes in the sensitizing solution should not be capable of breaking up the dispersion.

If it is desirable to reduce the glossiness of the print somewhat a small percentage of silica (.5 to 2%) can be added to the precoat or to the sensitizing solution. The silica need not be of colloidal size providing it will remain dispersed in the solution during the coating operation.

The invention is further illustrated by the following examples:

*Example I*

A diazotype sensitizing solution was made up containing the following ingredients:

| | |
|---|---|
| Tartaric acid _____g__ | 40 |
| p-Diazo - N,N - diethylaniline - zinc chloride double salt _____g__ | 20 |
| Thiourea _____g__ | 50 |
| 2,3 dihydroxy naphthalene 6-sulfonic acid_____g__ | 20 |
| 1,3,6-naphthalene trisulfonic acid sodium salt___g__ | 30 |
| Zinc chloride_____g__ | 40 |
| Darex X–52L (unplasticized polyvinyl acetate dispersion of 50% solids)_____cc__ | 100 |
| Water _____cc__ | 900 |

A commercially sized paper of the type generally used for the production of diazotype materials was machine coated with the above solution and dried. Test prints were made on this paper and they showed very good contrast and a slightly glossy finish. The colored areas were uniform even at low exposures. The prints could be written upon with ink without feathering.

*Example II*

A commercially sized paper was precoated with a solution made up as follows:

| | Cc. |
|---|---|
| Water _____ | 700 |
| Darex X–52L (unplasticized polyvinyl acetate dispersion of 50% solids)_____ | 300 |

The precoated paper was then sensitized by coating with the sensitizing solution of Example I including the resin dispersion. Test prints made on this paper showed excellent contrast and a higher gloss than the prints made according to Example I. The colored areas were very uniform even at low exposure and the prints could be written upon with ink without feathering.

*Example III*

A commercially sized paper was precoated with a solution made up as follows:

| | Cc. |
|---|---|
| Water _____ | 500 |
| Darex X–52L (unplasticized polyvinyl acetate dispersion of 50% solids)_____ | 500 |

The precoated paper was then sensitized with the following solution:

| | |
|---|---|
| Tartaric acid_____g__ | 40 |
| p-Diazo - N,N - diethylaniline-zinc chloride double salt _____g__ | 20 |
| Thiourea _____g__ | 50 |
| 2,3 dihydroxy naphthalene-6-sulfonic acid____g__ | 20 |
| 1,3,6-naphthalene trisulfonic acid sodium salt___g__ | 30 |
| Zinc chloride_____g__ | 40 |
| Water _____cc__ | 1000 |

Test prints made on this paper showed excellent contrast and very high gloss. At low exposures, the colored areas were not quite as uniform (slight grainy appearance) as the prints made according to Example I but the prints could be written upon with ink without feathering.

Example IV

Tests were made in exactly the same manner as described under Example III except that an Everflex plasticized polyvinyl acetate dispersion was substituted for the Darex unplasticized polyvinyl acetate dispersion in both the precoat and the sensitizing solution. The same good results were obtained.

Example V

Example I was repeated but adding 1% Santocel (silica) to the sensitizing solution. The prints were not glossy but all the other advantages obtained by adding the resin dispersion were preserved.

Having thus described the invention, what is claimed is:

1. A photosensitive material for forming a colored azo dye image comprising a paper base sheet capable of providing color contrast with an azo dye image and having a coating of an aqueous dispersion of solid resin particles selected from the group consisting of polyvinyl acetate resin particles and plasticized polyvinyl acetate resin particles as the sole organic colloid and forming a continuous film, said dispersion having a solids content of said resin of at least 5% and said continuous film being sensitized with a light sensitive diazo compound.

2. A photosensitive material for forming a colored azo dye image comprising a paper base sheet capable of providing color contrast with an azo dye image and having a coating of an aqueous sensitizing solution including a light sensitive diazo compound and dispersed solid resin particles selected from the group consisting of polyvinyl acetate resin particles and plasticized polyvinyl acetate resin particles as the sole organic colloid and forming a continuous film, the solids content of said synthetic resin particles in said aqueous solution being at least 5%.

3. A photosensitive material for forming a colored azo dye image comprising a paper base sheet capable of providing color contrast with an azo dye image and having a coating of an aqueous dispersion of solid resin particles selected from the group consisting of polyvinyl acetate resin particles and plasticized polyvinyl acetate resin particles as the sole organic colloid and forming a continuous film, said dispersion having a solids content of said resin of at least 5% and said continuous film being sensitized with an aqueous sensitizing solution including a light sensitive diazo compound and including dispersed solid resin particles selected from the group consisting of polyvinyl acetate resin particles and plasticized polyvinyl acetate resin particles as the sole organic colloid, the solids content of said resin particles in said aqueous solution being at least 5%, said resin particles forming a continuous film on the base sheet.

4. A photosensitive material for forming a colored azo dye image comprising a paper base sheet capable of providing color contrast with an azo dye image and having a coating of an aqueous dispersion of solid resin particles selected from the group consisting of polyvinyl acetate resin particles and plasticized polyvinyl acetate resin particles as the sole organic colloid and forming a continuous film, said dispersion having a solids content of said resin of at least 5%, from .5 to 2.0% of dispersed silica added to said dispersion and said film being sensitized with a light sensitive diazo compound.

5. A photosensitive material for forming a colored azo dye image comprising a paper base sheet capable of providing color contrast with an azo dye image and having a coating of an aqueous dispersion of solid resin particles selected from the group consisting of polyvinyl acetate resin particles and plasticized polyvinyl acetate resin particles as the sole organic colloid and forming a continuous film, said dispersion having a solids content of said resin of at least 5%, sufficient dispersed silica being added to said dispersion to reduce the glossiness of the prints obtained and said film being sensitized with a light sensitive diazo compound.

References Cited in the file of this patent

UNITED STATES PATENTS

| Number | Name | Date |
|---|---|---|
| 2,197,456 | Von Poser | Apr. 16, 1940 |
| 2,376,005 | Potter et al. | May 15, 1945 |
| 2,461,023 | Barnes | Feb. 8, 1949 |
| 2,566,709 | Von Glahn et al. | Sept. 4, 1951 |
| 2,572,252 | Erasmus et al. | Oct. 23, 1951 |
| 2,662,013 | Sulich et al. | Dec. 8, 1953 |
| 2,703,756 | Herrick et al. | Mar. 8, 1955 |
| 2,726,956 | Jahoda | Dec. 13, 1955 |

FOREIGN PATENTS

| Number | Country | Date |
|---|---|---|
| 402,737 | Great Britain | Mar. 5, 1932 |
| 562,666 | Great Britain | July 11, 1944 |